March 12, 1968     J. M. LIEBIG     3,372,941
VALVE SEAL
Filed Jan. 26, 1965
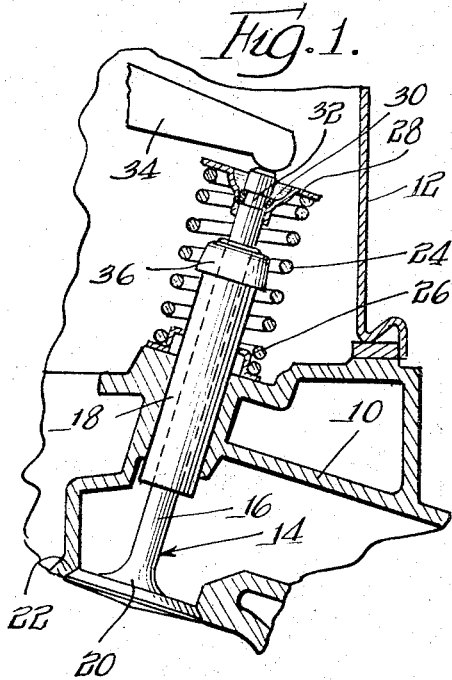
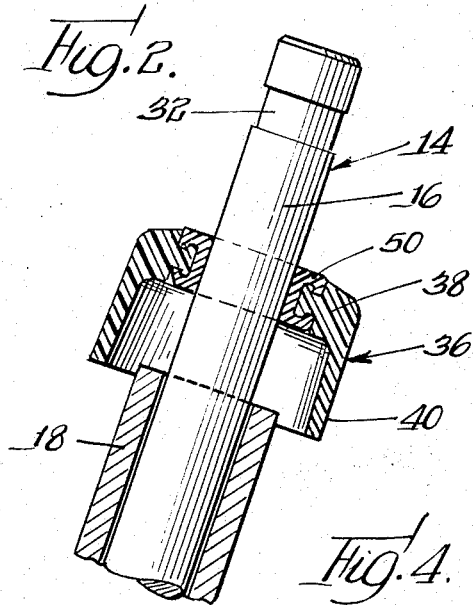
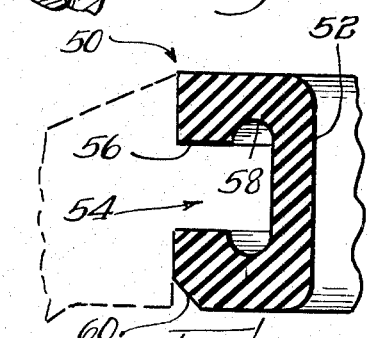
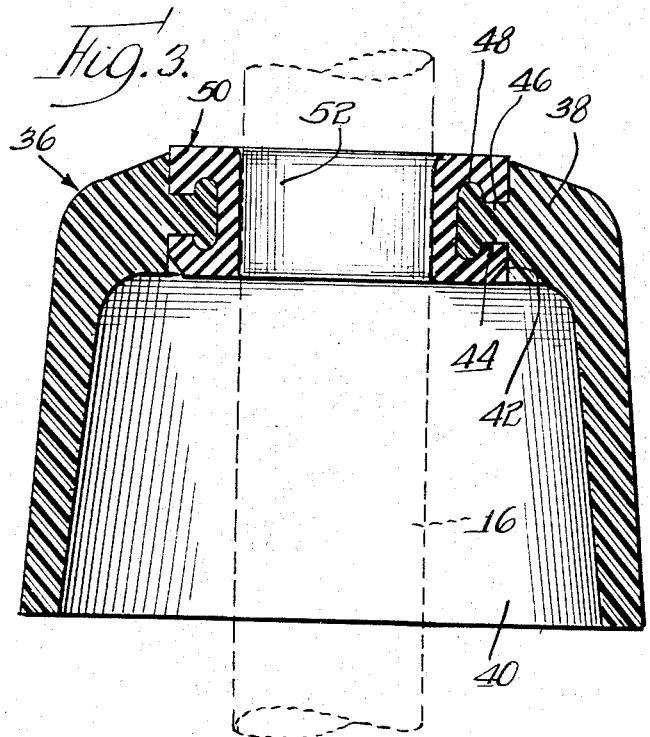
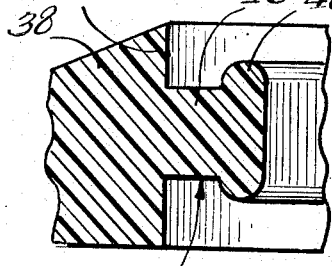
Inventor
Joseph M. Liebig
By: Olson, Trexler, Wolters & Bushnell
Attys.

United States Patent Office 3,372,941
Patented Mar. 12, 1968

3,372,941
VALVE SEAL
Joseph M. Liebig, Wheaton, Ill., assignor to Illinois Milling, Incorporated, Chicago, Ill., a corporation of Illinois
Filed Jan. 26, 1965, Ser. No. 428,080
5 Claims. (Cl. 277—178)

This invention relates to an improved valve stem seal, particularly for an automotive engine.

In gasoline engines, as commonly used in automobiles and the like, there are two valves for each cylinder which reciprocate at proper times to allow a combustion charge to be drawn in and the burned gases to be exhausted. Rather considerable vacuum is developed in a cylinder on an intake stroke of the corresponding piston, and there thus is a tendency to pull oil into the combustion chamber along the valve stem, between the valve stem and guide. It is undesirable to allow any substantial amount of oil so to pass into the combustion chamber, since it results in high oil consumption, and further causes a smoky exhaust, and may result in harmful deposits in the combustion chamber. Typically, such deposits tend to build up between the valve and the valve seat, preventing the valve from closing properly, and leading in turn to burning of the valve and malfunction of the engine.

In modern overhead valve type engines, it has become fairly common practice to provide a valve seal somewhat in the nature of a skirt or umbrella which is resiliently fixed in place on the valve stem and rides up and down with it, shielding the top of the valve stem guide against splashing oil. This valve seal is commonly made of rubber, and as exemplary of the prior art, Smith et al. U.S. Patent 2,698,012 may be considered. Such valve seals have in time hardened and lost their elasticity. They have loosened on the valve stem and have just rested on the top of the valve guide without serving their intended function. In many instances, the seal has actually cracked and broken apart and become completely useless.

Silicone rubber is known to withstand high temperatures, and from this standpoint would be satisfactory for use in a valve seal of the type under consideration. However, it has drawbacks. It is too expensive for the highly competitive automotive industry to make an entire seal of silicone rubber. Furthermore, silicone rubber when exposed to hot oil swells and may also lose its shape.

It is an object of the present invention to provide a valve stem seal utilizing the desirable properties of silicone rubber while overcoming or eliminating the undesirable qualities.

More particularly, it is an object of this invention to provide a two-piece valve stem seal made of silicone rubber and an inexpensive molded plastic.

Furthermore, it is an object of this invention to provide a valve stem seal comprised mainly of inexpensive, molded plastic and having a high temperature resistant elastomeric insert mounting the seal on a valve stem.

Other and further objects and advantages of the present invention will be apparent from the following description when taken in connection with the accompanying drawings wherein;

FIG. 1 is a fragmentary view in vertical section through the head of an overhead valve internal combustion engine showing a valve and related parts;

FIG. 2 is an enlarged fragmentary view showing a portion of the valve stem, seal and guide;

FIG. 3 is a further enlarged axial sectional view through the valve seal forming the subject matter of the present invention;

FIG. 4 is a further enlarged fragmentary sectional view showing the valve seal insert; and FIG. 5 is a view corresponding to FIG. 4 showing the adjacent portion of the valve seal body.

Referring now in greater particularity to the drawings, and first to FIG. 1, there will be seen the usual head 10 of an automotive engine of conventional construction, and having a valve lifter cover or rocker arm cover 12 secured thereon in any suitable manner. The usual poppet valve 14 is provided, having a stem 16 reciprocable in a guide 18 fixed in the head, and further having a valve head 20 seating against a seat 22 formed in the head, either integrally, or as an insert. The valve stem is surrounded by a compression helical spring 24 bearing at the bottom against a bushing or spring locator 26 centered about the valve stem guide 18 and bearing against a fixed part of the head. At the top, the spring bears against the usual spring retainer 28 held in place by the usual valve spring retainer locks 30 received in an annular groove 32 adjacent the upper end of the valve stem. One end of a rocker arm 34 bears against the upper end of the valve stem for periodically opening a valve as the rocker arm is pivoted by a valve lifter (not shown).

In addition, and as seen particularly in FIGS. 2–5, a valve seal 36 is provided on the valve stem 16 above the valve guide 18. The valve seal, as is known, is of an inverted cup-shaped construction. The valve seal comprises a body 38 of somewhat disk-like configuration, with a depending, and outwardly flaring skirt 40. The body, including the skirt, is made of a molded plastic material which will stand up to three hundred degrees Fahrenheit temperature without losing its form and shape. Nylon is one satisfactory material which is well known and which is available at an economical price, although there are many other plastic materials which are satisfactory.

The body 38 is provided with a central hole or aperture 42, and an insert retainer 44 extends radially in therefrom. The insert retainer comprises a neck 46 and an enlargement 48 outwardly therefrom, and extends completely around the inner circumference of the body in annular fashion. The neck 46 is somewhat shorter in a radial dimension than is its axial height, and the enlargement 48 or bead is substantially greater in axial height than is its radial dimension, all to provide for adequate strength and retention without intruding radially too great a distance.

Inwardly of the body 38 the oil seal is provided with an insert 50. The insert is annular, and is provided with a central, cylindrical bore 52. The exterior circumference of the insert 50 is complementary to the retainer 44, comprising a retainer receiving groove 54. This groove comprises a relatively narrow neck 56 and an enlarged recess 58 radially inwardly thereof. In addition, the outer circumference has a chamfered lower corner 60 facilitating assembly of the insert with the body. As will be apparent, the retainer 44 and retainer receiver or groove 54, being complementary in shape, interlock and firmly hold the insert 50 in place.

The insert is made of an elastomeric material which is resistant to rather high heat. As a specific example, the insert 50 (which might also be termed a grommet) is made of a silicone rubber that will easily withstand five hundred degrees Fahrenheit.

The seal 36 is assembled with the valve stem before the spring and associated parts are assembled therewith, but after insertion of the valve stem through the guide 18. The seal is disposed relatively adjacent the guide 18, and the first time the valve is moved to open position the seal abuts the top of the guide 18, and is relatively moved up on the stem to a position where it stays indefinitely.

As will be apparent, the highest temperature location for the valve seal is the part directly abutting the valve stem, and this is the silicone rubber which is adapted to withstand the high heat. The amount of silicone rubber necessary is rather small, and hence the cost thereof is low. The cost of the plastic body also is low, due to an inexpensive material, and the assembly of the two parts is sufficiently simple that it does not run the cost up unduly. The seal is competitive in price with previous unitary rubber seals.

As has been noted earlier, silicone rubber tends to swell and may also lose its shape in the presence of hot oil. In the present instance this is not a drawback. Swelling of the silicone rubber simply tightens the seal in place on the valve stem. Some loss of shape is of no consequence, since there is really no place for the rubber insert or grommet to go except to be squeezed between the valve stem and the body.

The seal as now fully disclosed herein is competitive in price with existing one-piece rubber seals. It has a practically indefinite service life, and rather than being loosened and made ineffectual by hot oil is actually tightened thereby. It will be appreciated that the initial fit is tight, but not so tight that the oil seal cannot move into proper place upon the first opening of the valve. Thereafter, the seal tightens further upon exposure to hot oil, thereby being seated more firmly on the valve stem against possible shaking up and down upon movement of the valve at high speeds between open and close positions.

It is noteworthy that the silicone rubber is a good thermal insulator and keeps the high heat of the valve stem from being transferred to the body, which may be of a material such as nylon which is susceptible to deformation by high heat.

The specific example of the invention as heretofore disclosed is for illustrative purposes only. Various changes in structure will doubtless occur to those skilled in the art, and will be understood as forming a part of the present invention insofar as they fall within the spirit and scope of the appended claims.

The invention is claimed as follows:

1. In a valve seal and valve stem assembly for use in an internal combustion engine, the provision of a cup-shaped body of semi-rigid synthetic plastic resinous material capable of maintaining its form and shape up to about 300° F. and having an inwardly directed portion defining an axial aperture therethrough larger than the diameter of the valve stem leaving a space therebetween, and a relatively non-rigid insert of elastomeric material disposed within the aperture and substantially coextensive with the axial extent of the inwardly directed portion of the cup-shaped body and interlocked therewith and substantially filling the space between the inwardly directed portion of the body and the valve stem, said elastomeric material having the properties of withstanding up to about 500° F. and swelling in the presence of hot oil whereby the assembled body and insert is slidably assembled with the valve stem when initially positioned thereon and wherein subsequent heat swelling of the insert in use fixedly grips the valve stem for movement of the valve seat in unison therewith and with the inwardly directed portion of the cup-shaped body serving to back up the insert against outward radial enlargement.

2. In a valve seal and valve stem assembly as claimed in claim 1, wherein the semi-rigid synthetic plastic resinous material of the cup-shaped body is nylon.

3. In a valve seal and valve stem assembly as claimed in claim 1, wherein the elastomeric material of the insert comprises a silicone rubber.

4. In a valve seal and valve stem assembly as claimed in claim 1, wherein the semi-rigid synthetic plastic resinous material of the cup-shaped body is nylon, and wherein the elastomeric material of the insert comprises a silicone rubber.

5. In a valve seal and valve stem assembly as claimed in claim 1, wherein the interlock between the inwardly directed portion of the cup-shaped body and the insert comprises rib and groove means.

References Cited
UNITED STATES PATENTS

| | | | |
|---|---|---|---|
| 3,228,384 | 1/1966 | Brown | 123—188 |
| 2,736,585 | 2/1956 | Riesing | 277—153 |
| 2,906,255 | 9/1959 | Bunce | 277—33 X |
| 3,166,333 | 1/1965 | Henley | 277—199 |

FOREIGN PATENTS 974,421 11/1964 Great Britain.

OTHER REFERENCES

Lubrication, published by Texaco Inc., August 1963, pages 119 to 121.

SAMUEL ROTHBERG, *Primary Examiner.*

UNITED STATES PATENT OFFICE

CERTIFICATE OF CORRECTION

Patent No. 3,372,941                                March 12, 1968

Joseph M. Liebig

It is certified that error appears in the above identified patent and that said Letters Patent are hereby corrected as shown below:

Column 4, line 11, "of the valve seat" should read -- of the valve seal --.

Signed and sealed this 5th day of August 1969.

(SEAL)
Attest:

Edward M. Fletcher, Jr.
Attesting Officer

WILLIAM E. SCHUYLER, JR.
Commissioner of Patents